(12) United States Patent
Hung et al.

(10) Patent No.: US 11,364,694 B2
(45) Date of Patent: Jun. 21, 2022

(54) METHOD OF FORMING SET PIN HOLE OF INSULATED CARBINE HOOK

(71) Applicant: YOKE INDUSTRIAL CORP., Taichung (TW)

(72) Inventors: Wei-Chieh Hung, Taichung (TW); Chia-Hsien Wang, Shengang Township (TW); Ya-Chun Cheng, Ershui Township (TW)

(73) Assignee: YOKE INDUSTRIAL CORP., Taichung (TW)

( * ) Notice: Subject to any disclaimer, the term of this patent is extended or adjusted under 35 U.S.C. 154(b) by 328 days.

(21) Appl. No.: 16/695,605

(22) Filed: Nov. 26, 2019

(65) Prior Publication Data

US 2021/0154955 A1 May 27, 2021

(51) Int. Cl.
*B29C 70/68* (2006.01)
*B29L 31/00* (2006.01)

(52) U.S. Cl.
CPC ....... *B29C 70/681* (2013.01); *B29L 2031/738* (2013.01)

(58) Field of Classification Search
CPC .............. B29C 70/681; B29C 33/0033; B29C 37/0028; B29C 70/70; B29L 2031/738
See application file for complete search history.

(56) References Cited

U.S. PATENT DOCUMENTS

| 2004/0051211 A1* | 3/2004 | Mastro ................. B29C 41/085 264/438 |
| 2016/0303781 A1* | 10/2016 | Vogler .............. B29C 45/14311 |
| 2017/0307004 A1* | 10/2017 | Cardella ............... E05B 15/102 |

FOREIGN PATENT DOCUMENTS

DE  10251901 A1 * 7/2003 ............. B29C 45/26

OTHER PUBLICATIONS

English Translation of DE10251901A1 retrieved from Espacenet (Year: 2021).*

\* cited by examiner

*Primary Examiner* — Francisco W Tschen
*Assistant Examiner* — Elisa H Vera
(74) *Attorney, Agent, or Firm* — Tracy M. Heims; Apex Juris, Pllc.

(57) ABSTRACT

A method of forming set pin hole of an insulated carbine hook includes: providing a core material with a perforation and a recess; putting the core material in a mold cavity of a mold including a movable pin protruding from an inner surface of the mold cavity, which is at an opening of the perforation; filling insulated material between an outer surface of the core material and the inner surface, and in the perforation and recess; forming an insulated layer on the outer surface and in the perforation and recess to obtain an insulated intermediate having a notch at the opening; aiming a removal tool at the notch; removing the insulated material at the other opening of and in the perforation, and at an opening of and in the recess to form the set pin hole, which makes the manufacturing a main body of the insulated carbine hook easy.

7 Claims, 17 Drawing Sheets

METHOD OF FORMING SET PIN HOLE OF INSULATED CARBINE HOOK

BACKGROUND OF THE INVENTION

Technical Field

The present invention relates generally to a method of forming set pin hole, and more particularly to a method of forming set pin hole of insulated carbine hook.

Description of Related Art

In general carbine hooks have been widely used in various working environments such as aloft working environments, or used as the safety buckles for fixing large amount of goods, lifting, and transportation. A common carbine hook is an O-shaped closed loop structure formed by a C-shaped main body and a brake bar which are connected. In usage state, the two opposite ends of the closed loop structure are usually tied with two straps respectively. That is, the two straps are connected by the carbine hook to form a secure connection structure.

However, the two straps may slide relative to the carbine hook due to the rotation of the carbine hook while being used, which makes the two straps slide to the same side of the carbine hook, even overlap each other. In such situation, the overall safety of the abovementioned connection structure would be lower. Besides, the two straps in such situation couldn't be easily removed from the carbine hook, which causes inconvenience to users.

To solve the above problem, the current carbine hook includes a set pin passing through the main body thereof to divide the O-shaped closed loop structure into two separate and closed regions. Therefore, the two straps will always be kept at the opposite ends of the carbine hook respectively due to the separation of the set pin, rather than sliding to the same side or even overlapping mentioned above.

Nevertheless, when producing insulated carbine hooks, the set pin hole would be covered by insulated layer, which increases difficulty in manufacturing insulated carbine hooks with set pins. Accordingly, the method of forming the set pin hole of insulated carbine hook has to be improved.

BRIEF SUMMARY OF THE INVENTION

In view of the above, the primary objective of the present invention is to provide a method of forming a set pin hole of an insulated carbine hook, which including the step of forming a notch on the insulated layer in perforation to be passed by the set pin. In this way, it's easy to recognize and aim a removal tool at the notch for removing insulated material inside the perforation, which achieves the purpose of easily producing a main body of an insulated carbine hook with a set pin hole.

The present invention provides a method of sending media files, which includes the following steps. Provide a core material which has a perforation and a recess; put the core material in a mold cavity of a mold which includes a movable pin protruding from an inner surface of the mold cavity, wherein the movable pin is positioned at an opening of the perforation of the core material; fill an insulated material in the mold cavity, wherein the insulated material is filled between an outer surface of the core material and the inner surface of the mold cavity as well as filled in the perforation and the recess; form an insulated layer on the outer surface of the core material and in the perforation as well as the recess to obtain an insulated intermediate which has a notch corresponding to the opening of the perforation; and aim a removal tool at the notch, and remove the insulated material at the other opening of the perforation and in the perforation, and furthermore remove the insulated material at an opening of the recess and in the recess, so as to form the set pin hole.

The effect of the present invention is, by forming the notch on the insulated layer in perforation to be passed by the set pin through the movable pin in the mold, it's easy to recognize and aim the removal tool at the notch for removing the insulated material inside the perforation, which achieves the purpose of easily producing the main body of the insulated carbine hook with the set pin hole.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
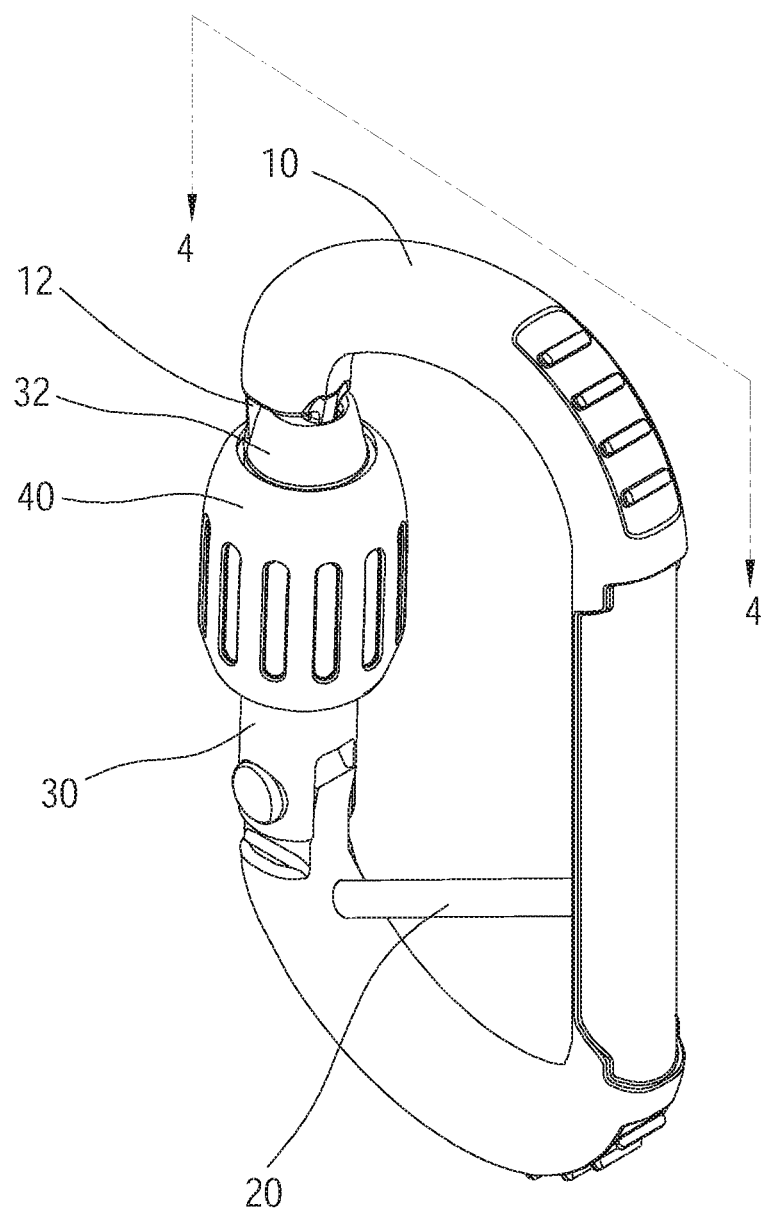
FIG. 1 is a perspective view of the insulated carbine hook of the first preferred embodiment of the present invention.
Figure 2:
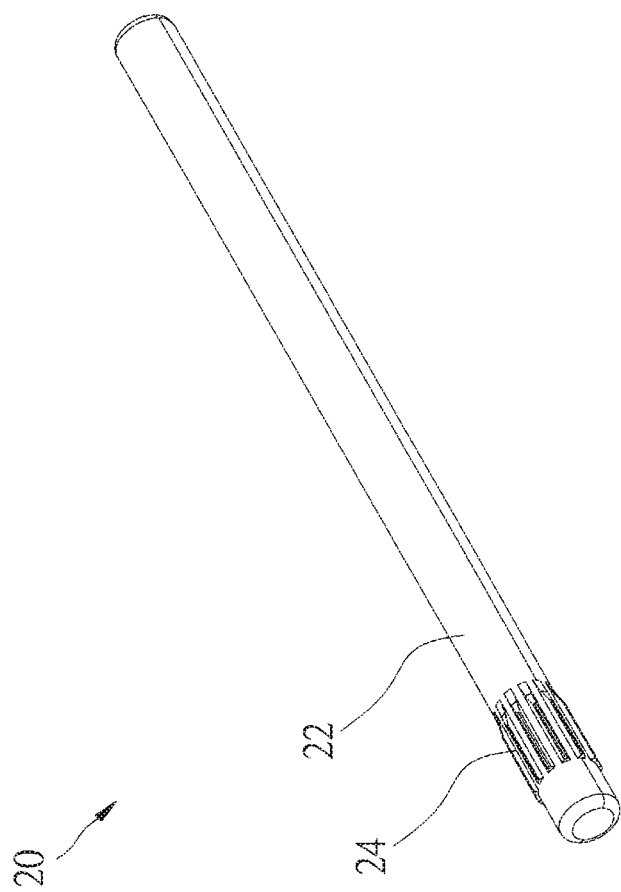
FIG. 2 is a perspective view of the insulated set pin in FIG. 1.
Figure 3:
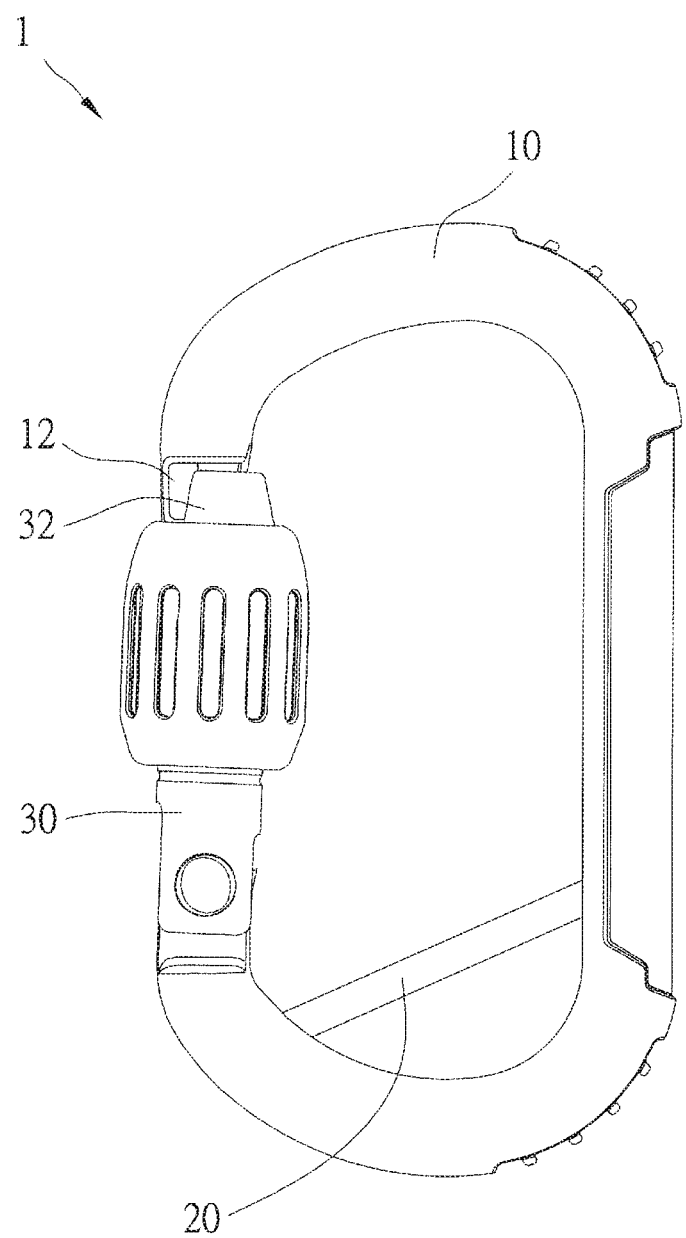
FIG. 3 is a lateral view of the insulated carbine hook in FIG. 1.
Figure 4:
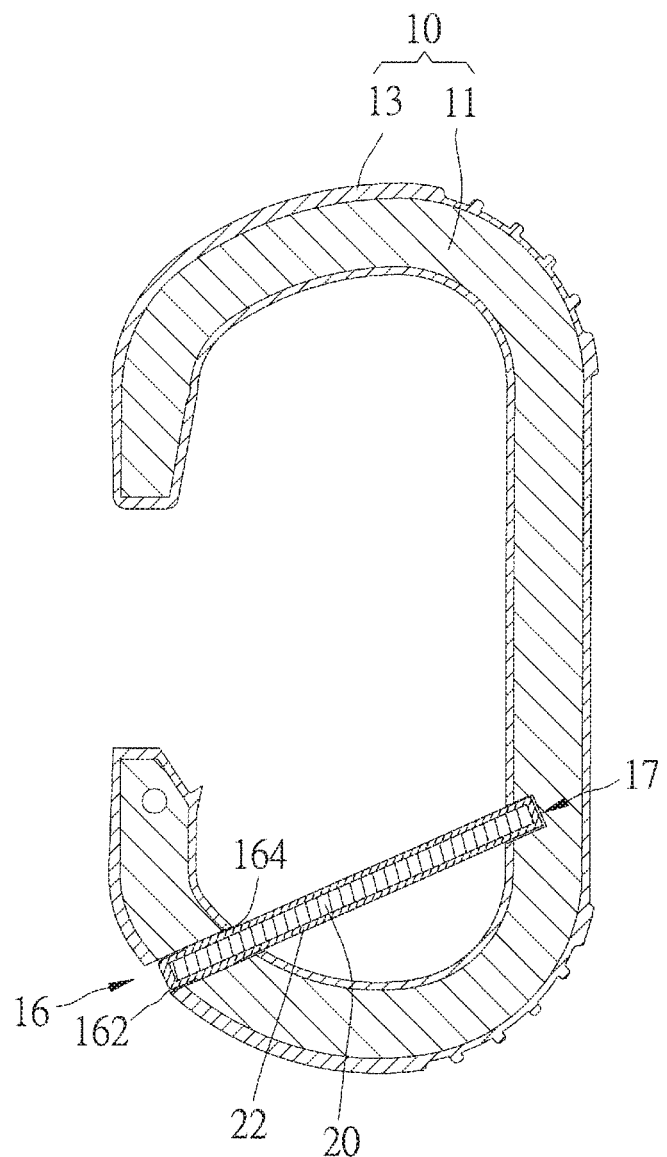
FIG. 4 is a sectional view of the combination of the insulated main body 10 and the insulated set pin 20 of the insulated carbine hook in FIG. 3 taken along line 4-4 in FIG. 1, wherein the insulated brake bar 30 and the insulated position limiting sleeve 40 are omitted.

Refer to FIG. 1 to FIG. 4, wherein FIG. 1 is a perspective view of an insulated carbine hook 1 of the first preferred embodiment of the present invention, FIG. 2 is a perspective view of an insulated set pin 20 in FIG. 1, FIG. 3 is a lateral view of the insulated carbine hook 1 in FIG. 1, and FIG. 4 is a sectional view of the combination of an insulated main body 10 and the insulated set pin 20 of the insulated carbine hook 1 in FIG. 3.

The insulated carbine hook 1 includes the insulated main body 10, the insulated set pin 20, an insulated brake bar 30, and an insulated position limiting sleeve 40. As shown in FIG. 1, FIG. 3, and FIG. 4, the insulated set pin 20 passes through and is fixed to the insulated main body 10 so that the loop of the insulated carbine hook 1 is divided into first region 102 and second region 104 which are respectively independent and closed. The insulated brake bar 30 is pivotally connected to the insulated main body 10, and the free end 32 of the insulated brake bar 30 can controllably abut against or deviate from the prop portion 12 of the insulated main body 10. The insulated position limiting sleeve 40 fits around the insulated brake bar 30, and is movable along the axis of the insulated brake bar 30. When the insulated position limiting sleeve 40 is close to the free end 32 of the insulated brake bar 30, the insulated position limiting sleeve 40 locks the insulated brake bar 30 so that the insulated brake bar 30 is unable to pivot relative to the insulated main body 10. By contrast, when the insulated position limiting sleeve 40 is away from the free end 32 of the insulated brake bar 30, the insulated position limiting sleeve 40 unlocks the insulated brake bar 30 so that the insulated brake bar 30 can pivot relative to the insulated main body 10.

As shown in FIG. 2, the insulated set pin 20 includes set pin core material (not shown) and an insulated layer 22, wherein the set pin core material is coated with the insulated layer 22. In this embodiment, the insulated set pin 20 has a plurality of ribs 24 protruding from the surface of the insulated layer 22 of the insulated set pin 20. As illustrated in FIG. 4, the ribs 24 of the insulated set pin 20 abut against the inner wall of a perforation 16 of the insulated main body 10 so that the insulated set pin 20 is not easy to slip from the perforation 16 of the insulated main body 10, which fixes the insulated set pin 20 to the insulated main body 10.

Figure 5:
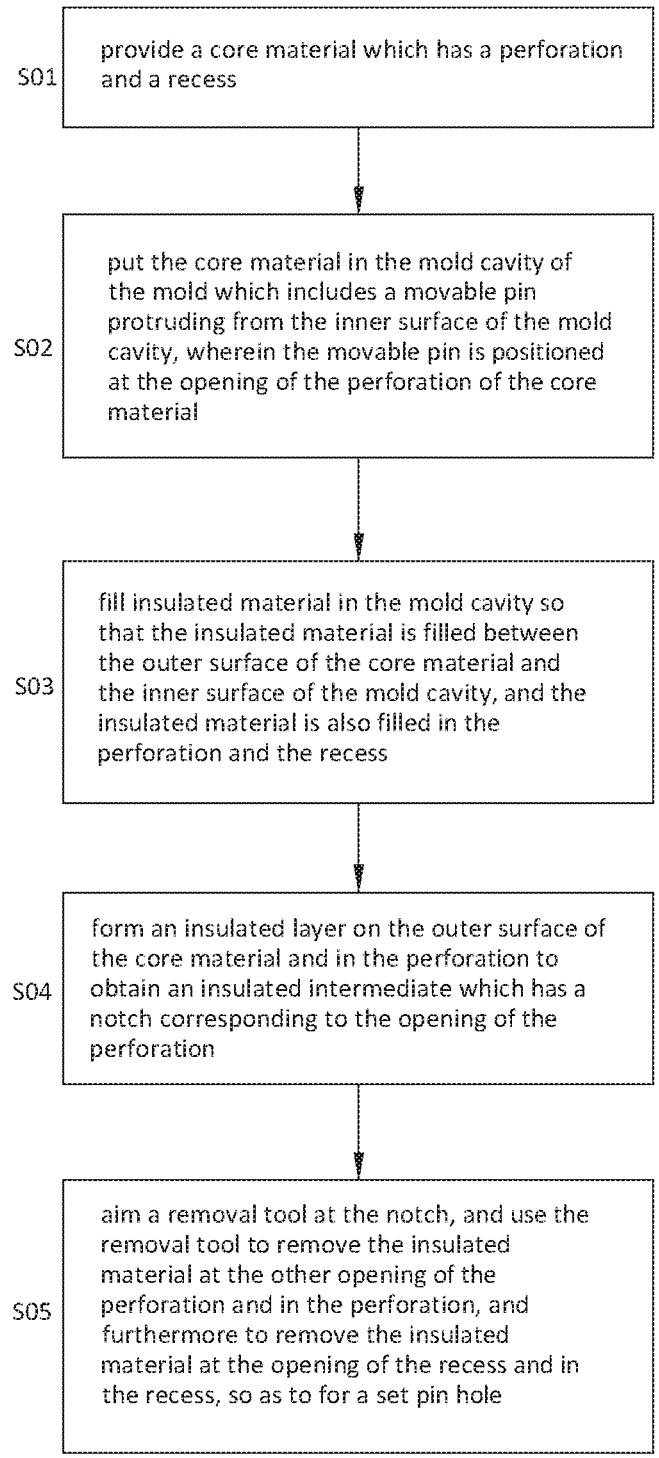
FIG. 5 is a flow chart of the first preferred embodiment of the present invention.

Referring to FIG. 5, the first preferred embodiment of the present invention, the method of forming a set pin hole of an insulated carbine hook, includes at least the following steps.

Step S01: provide a core material 11 which has a perforation 16 and a recess 17;

Step S02: put the core material 11 in the mold cavity of a second mold 60 which includes a movable pin 62 protruding from the inner surface 612 of the mold cavity 61, wherein the movable pin 62 is positioned at the opening 162 of the perforation 16 of the core material 11;

Step S03: fill insulated material in the mold cavity so that the insulated material is filled between the outer surface of the core material 11 and the inner surface of the mold cavity 61, and the insulated material is also filled in the perforation 16 and the recess 17;

Step S04: form an insulated layer 13 on the outer surface of the core material 11 and in the perforation 16 as well as the recess 17 to obtain an insulated intermediate 10' which has a notch 15 corresponding to the opening 162 of the perforation 16; and Step S05: aim a removal tool 70 at the notch 15, and use the removal tool 70 to remove the insulated material at the other opening 164 of the perforation 16 and in the perforation 16, and furthermore to remove the insulated material at the opening of the recess 17 and in the recess 17, so as to form a set pin hole.

Figure 6A:
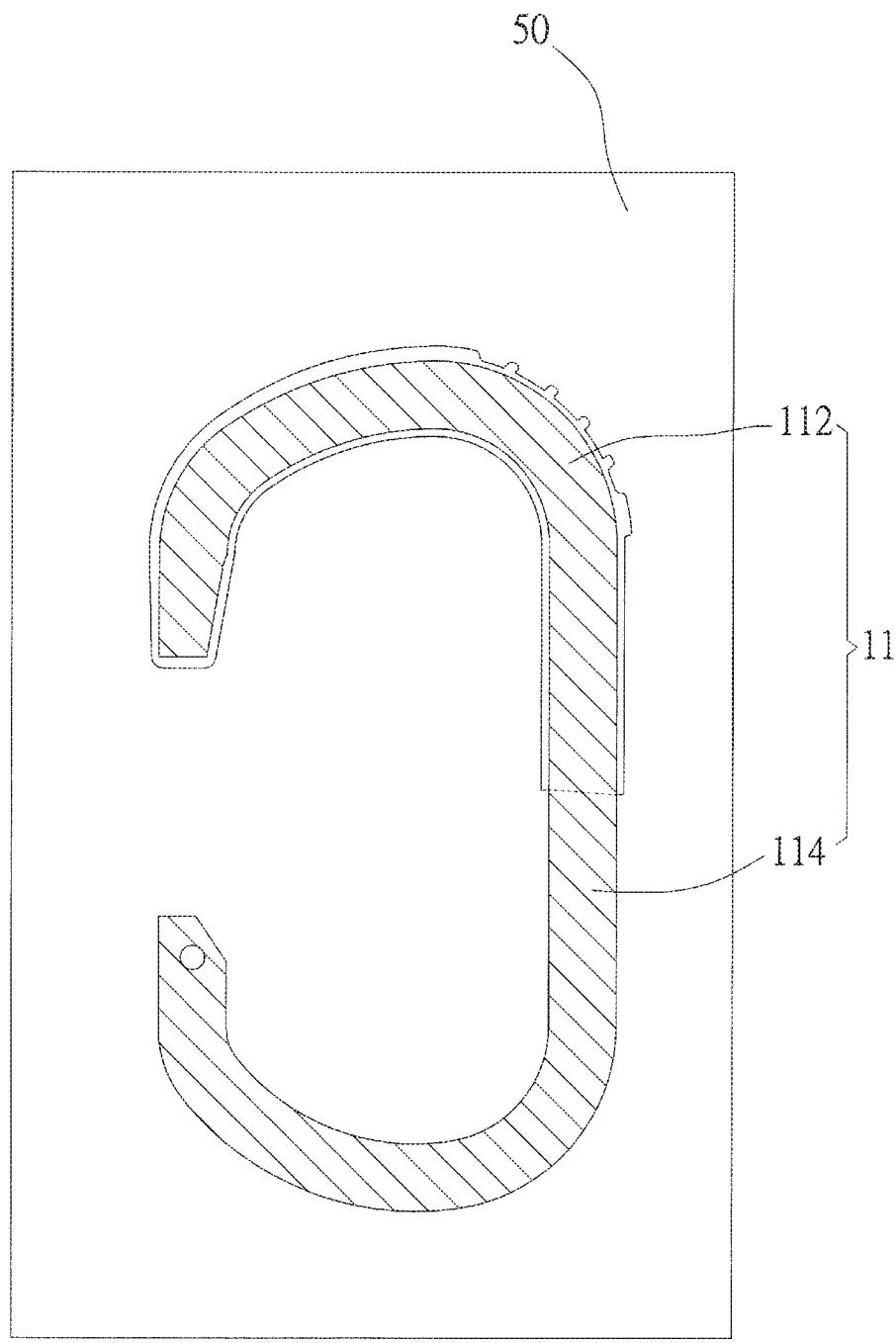
FIG. 6A is a schematic top view of the core material of the first preferred embodiment located in the first mold.
Figure 6B:
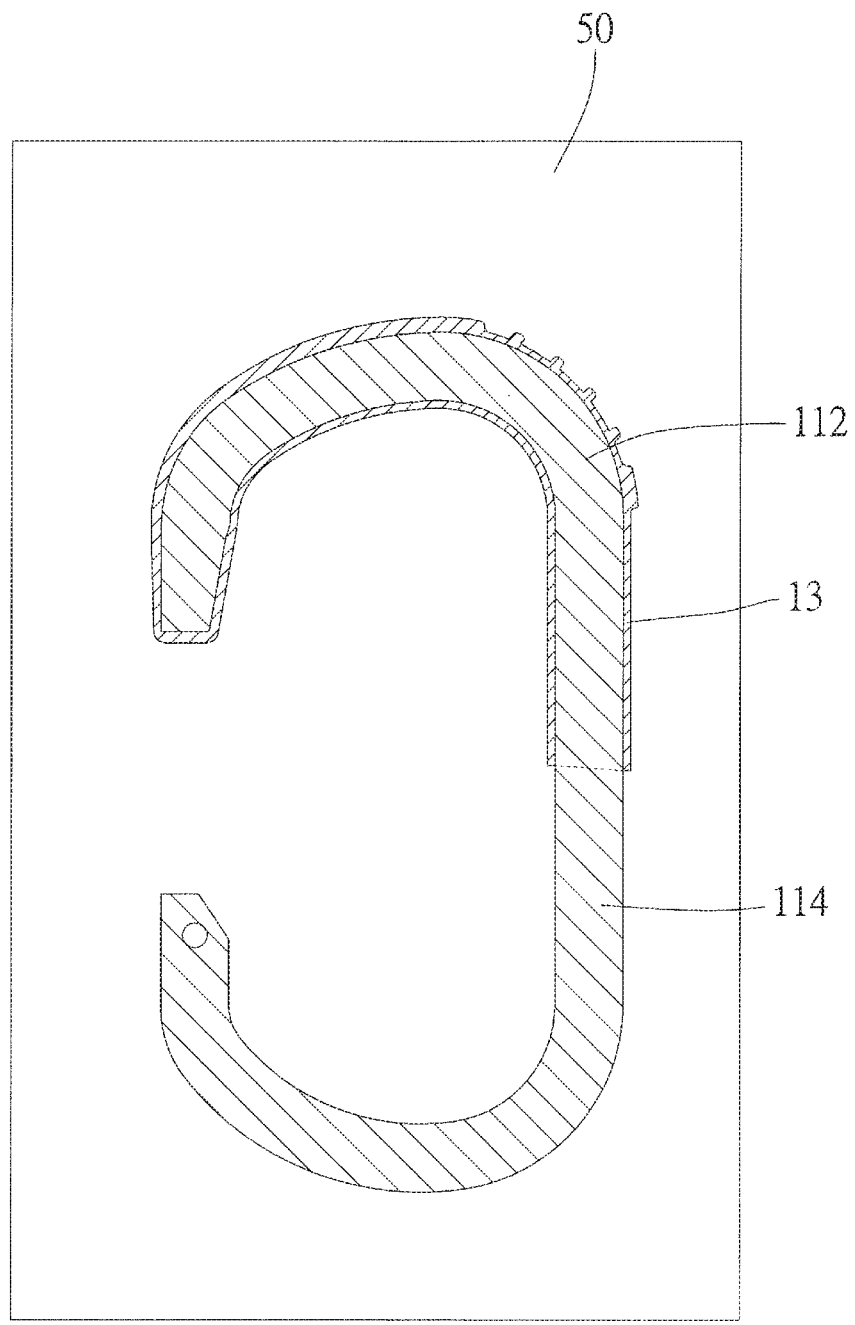
FIG. 6B is a schematic top view of the insulated layer formed on the first part surface of the core material through the first mold of the first preferred embodiment.

Before S01, the second part 114 of the core material 11 is tightly fixed in and touch the first mold 50, while there is a gap between the first part 112 of the core material 11 and the inner surface of the mold cavity of the first mold 50, as shown in FIG. 6A. Next, fill insulated material in the first mold 50 so that the gap between the first part 112 of the core material 11 and the mold cavity of the first mold 50 is filled with the insulated material, which forms the insulated layer 13 on the surface of the first part 112 of the core material 11, as shown in FIG. 6B.

Figure 6C:
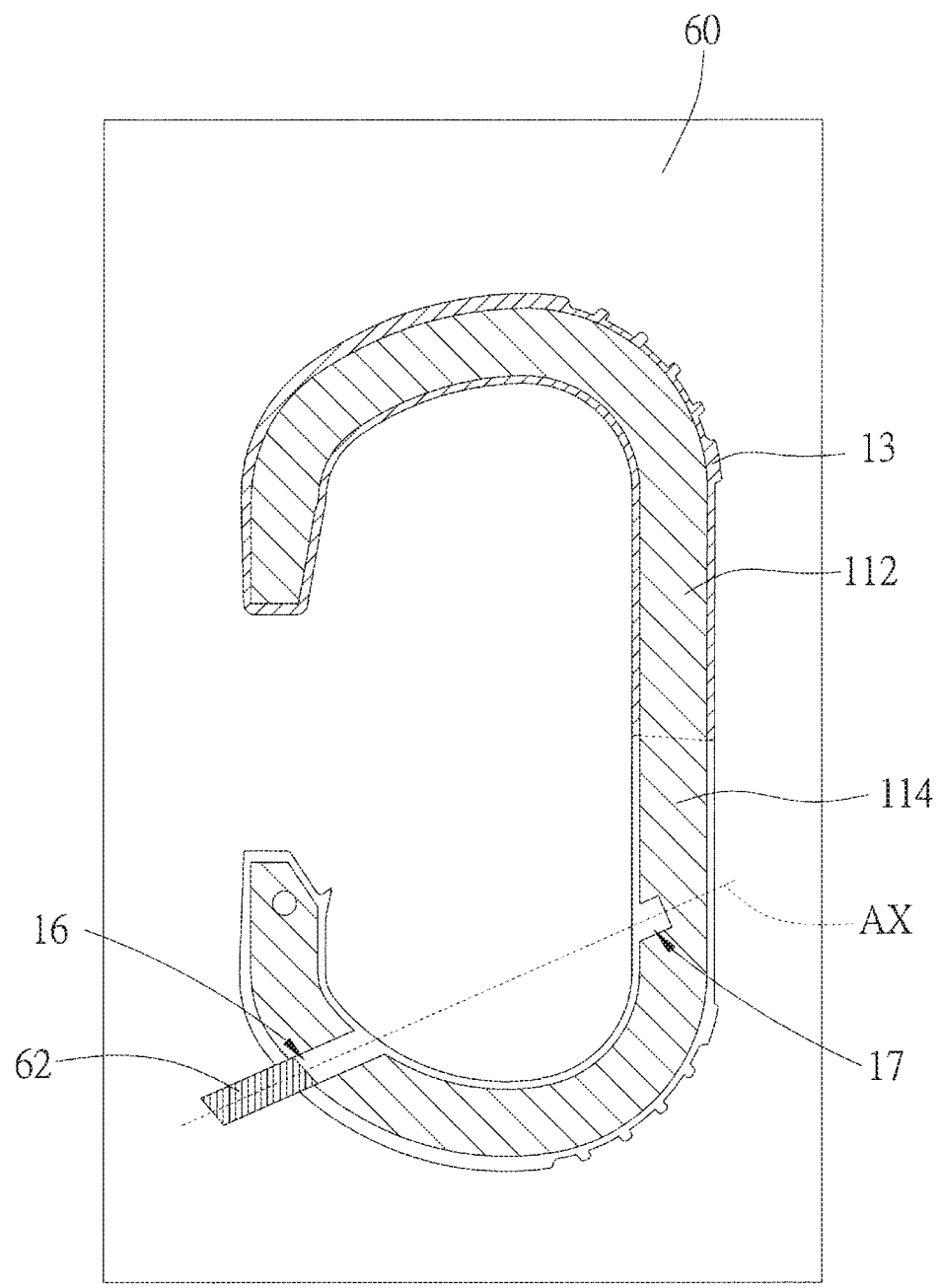
FIG. 6C is schematic top view diagram of the core material of the first preferred embodiment located in the second mold.

In step S01, the insulated layer 13 has been formed on the surface of the first part 112 of the core material 11, and the core material 11 has the perforation 16 and the recess 17, as shown in FIG. 6C. In this embodiment, the axial extension line AX of the perforation 16 passes through the recess 17, and furthermore passes through the center of the recess 17. In FIG. 6C, the first part 112 of the core material 11 with the insulated layer 13 is tightly fixed in the second mold 60, while there is a gap between the second part 114 of the core material 11 and the inner surface of the mold cavity of the second mold 60. The movable pin 62 is removably provided inside the perforation 16 of the core material 11.

Figure 6D:
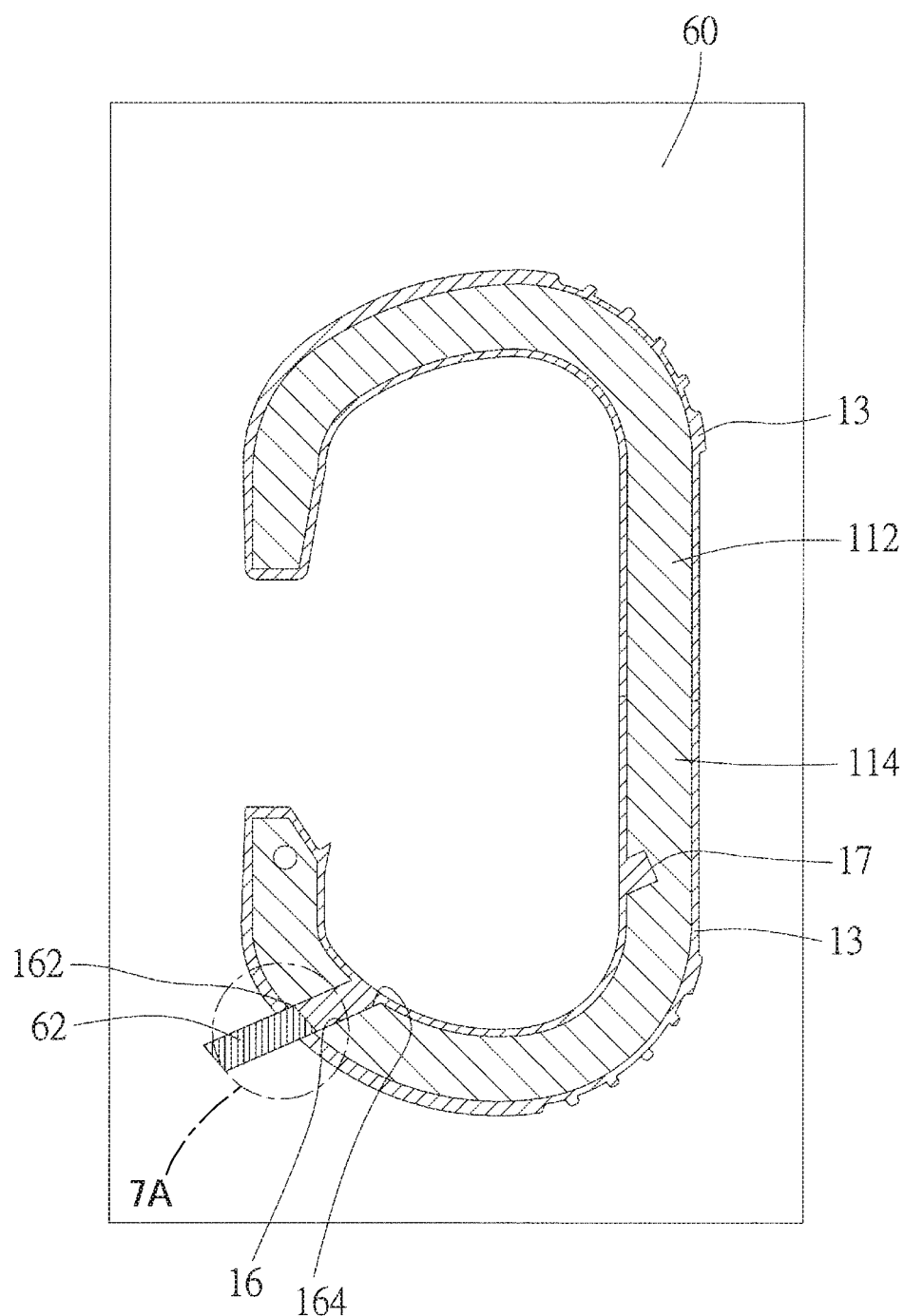
FIG. 6D is a schematic top view diagram of the insulated layer formed on the second part surface of the core material through the second mold of the first preferred embodiment.

And then, as illustrated in FIG. 6D, fill insulated material in the second mold 60 so that the gap between the second part 114 of the core material 11 and the mold cavity of the second mold 60 is filled with the insulated material, which forms the insulated layer 13 on the surface of the second part 114 of the core material 11. In this embodiment, the insulated material covers the other opening 164 of the perforation 16, and also fills the interior of the perforation 16. Moreover, the insulated material covers the opening of the recess 17 and fills the interior of the recess 17 in this embodiment.

Figure 7A:
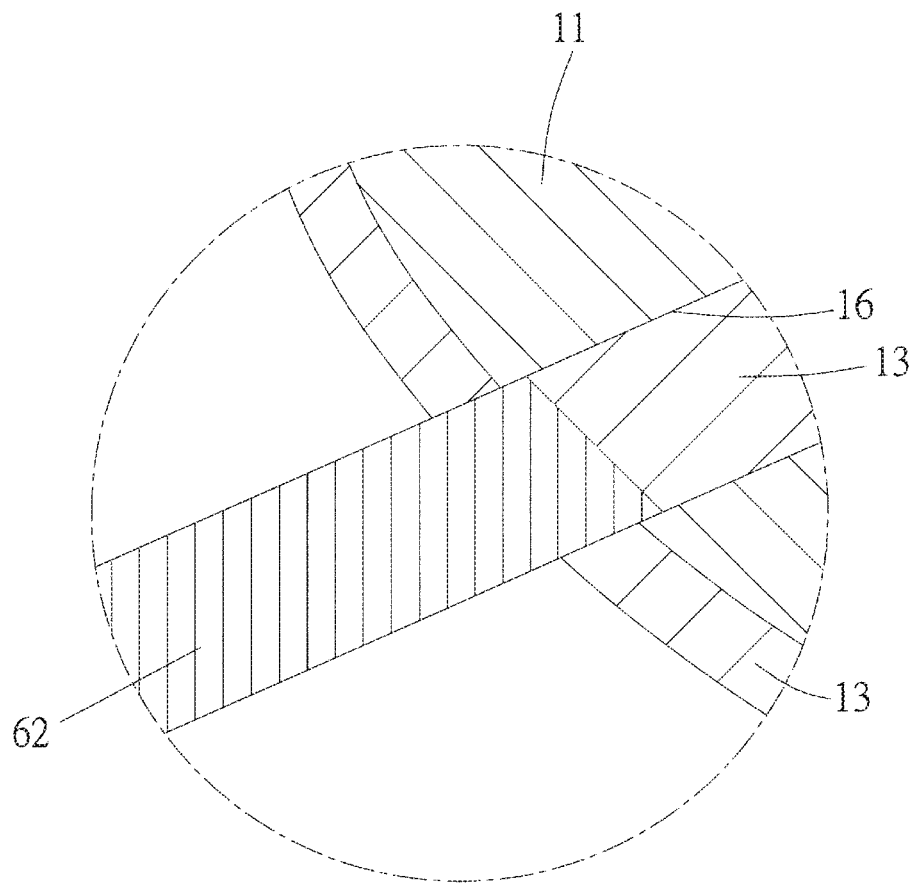
FIG. 7A is an enlarged partial view of the movable pin and the perforation of the core material of the first preferred embodiment shown in FIG. 6D.
Figure 7B:
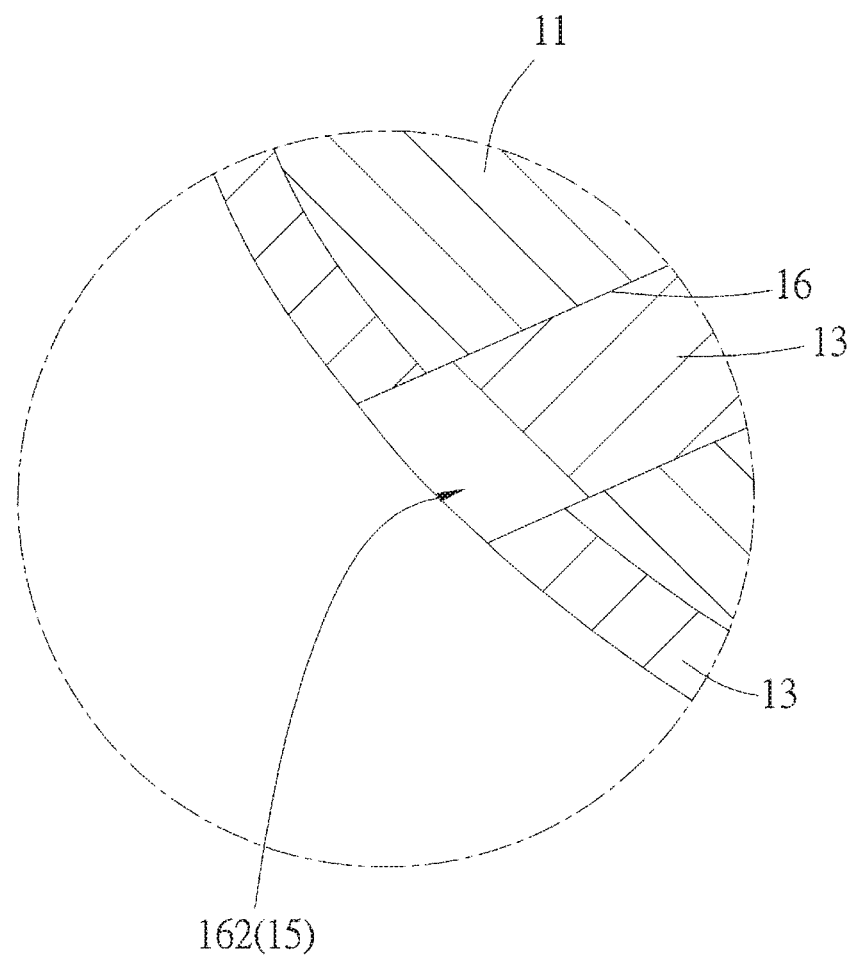
FIG. 7B is an enlarged partial view showing the perforation of the core material of FIG. 7A after removing the movable pin.

Referring to the FIG. 7A, the movable pin 62 is removably provided inside the perforation 16 of the core material 11, and the insulated material fills the gap between the core material 11 and the mold cavity of the second mold 60 as well as the interior of the perforation 16. When the movable pin 62 is removed from the perforation 16, the opening 162 of the perforation 16, i. e., the notch 15, is exposed, as shown in FIG. 7B.

Figure 8A:
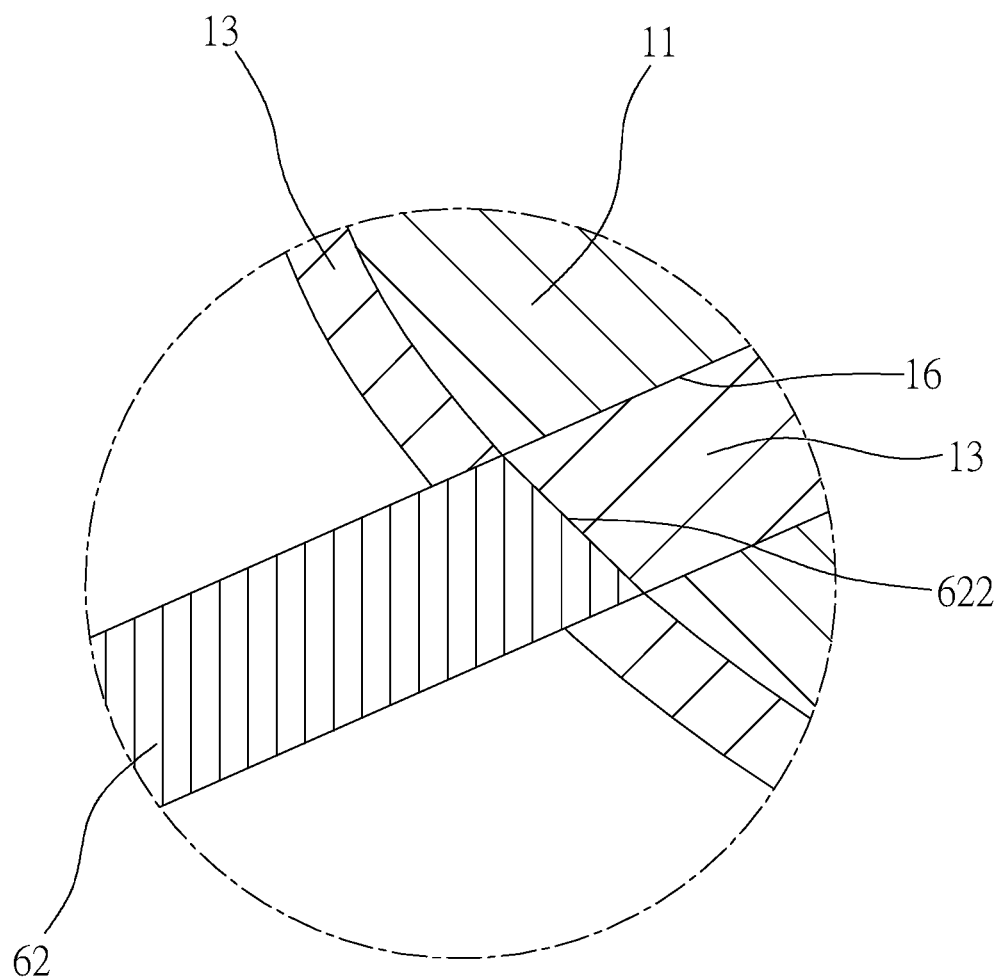
FIG. 8A is an enlarged partial view of the movable pin and the perforation of the core material of the second preferred embodiment.
Figure 8B:
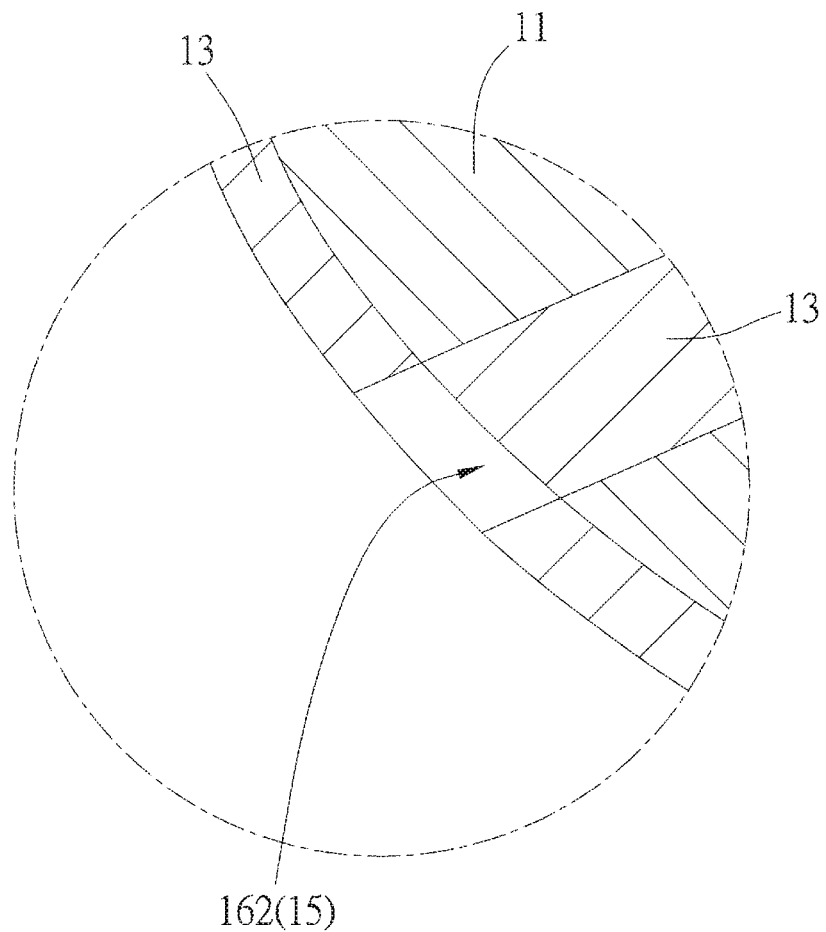
FIG. 8B is an enlarged partial view showing the perforation of the core material of FIG. 8A after removing the movable pin.

As depicted in FIG. 8A, in the second embodiment, the movable pin 62 is removably provided at the opening 162 of the perforation 16 of the core material 11; additionally, a surface 622 of the movable pin 62 faces towards the opening 162 of the perforation 16, wherein the surface 622 of the movable pin 62 is level with the opening 162. The insulated material fills the gap between the core material 11 and the mold cavity of the second mold 60 as well as the interior of the perforation 16. When the movable pin 62 is removed from the opening 162 of the perforation 16, the opening 162 of the perforation 16, i. e., the notch 15, is exposed, as shown in FIG. 8B.

Figure 9A:
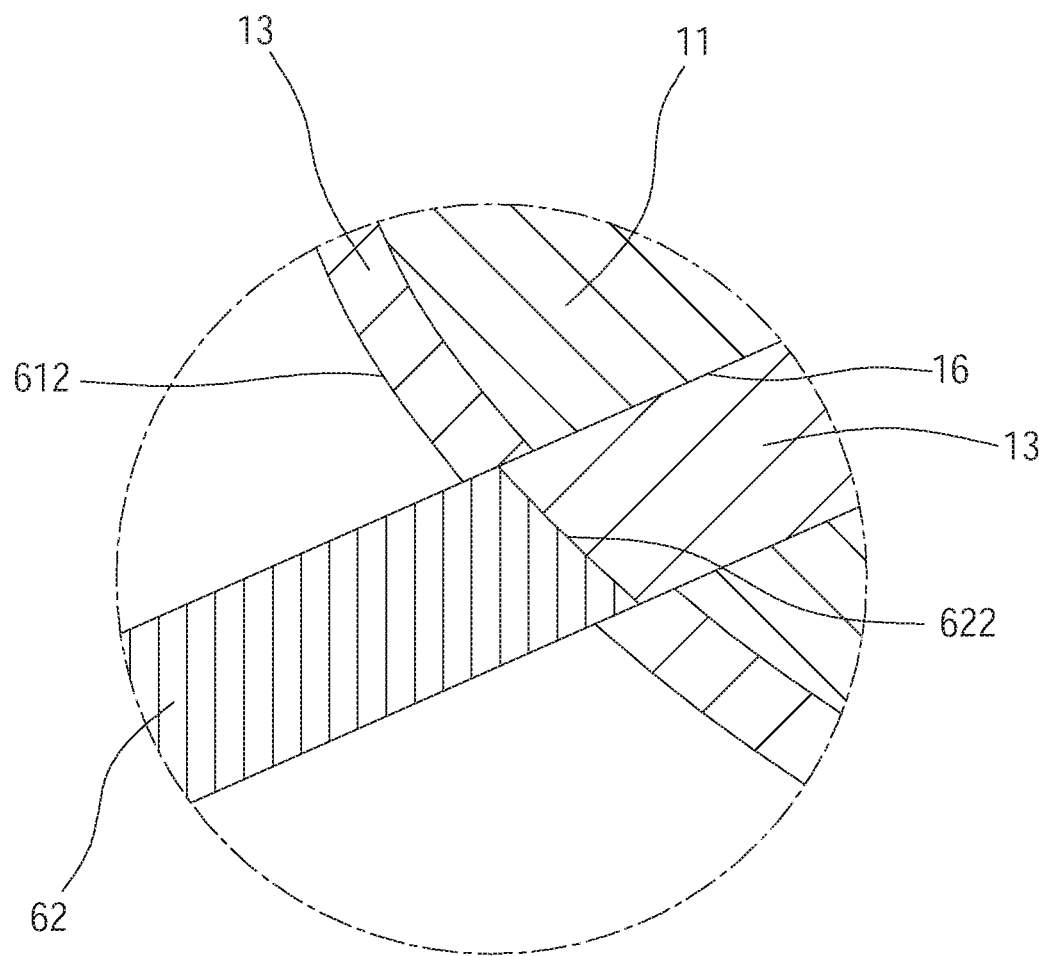
FIG. 9A is an enlarged partial view of the movable pin and the perforation of the core material of the third preferred embodiment.

Referring to FIG. 9A, in the third embodiment, a surface 622 of the movable pin 62 faces towards the opening 162 of the perforation 16. In addition, the surface 622 of the movable pin 62 is located between the inner surface 612 of the mold cavity and the outer surface of the core material 11.

Figure 9B:
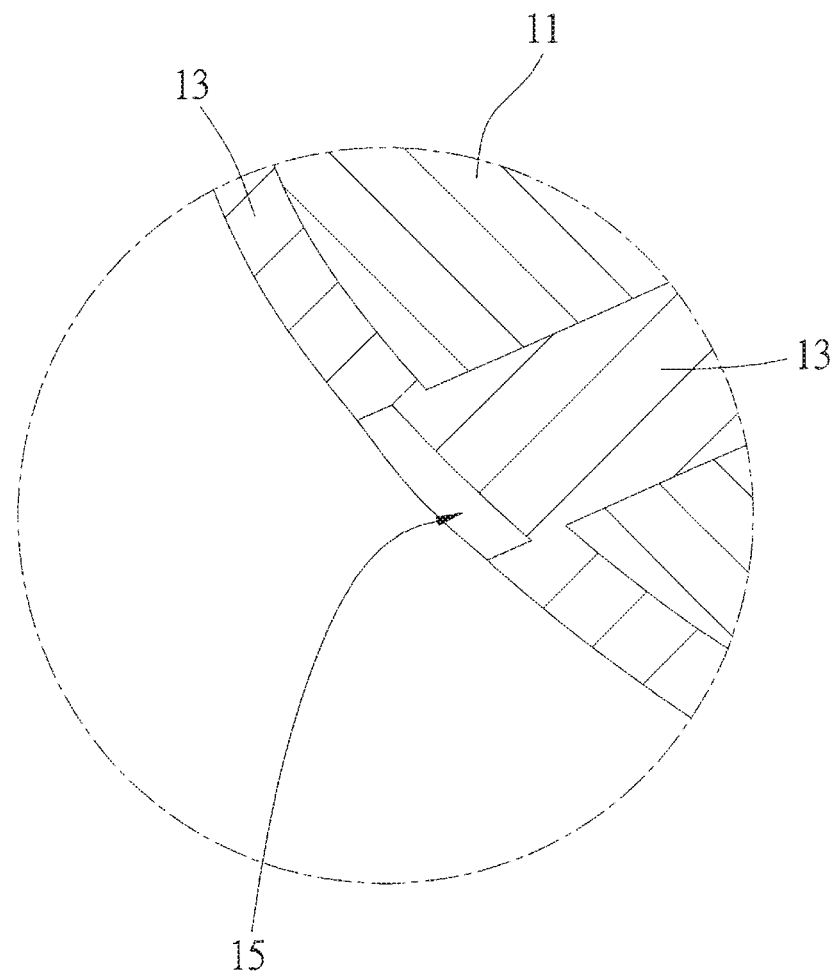
FIG. 9B is an enlarged partial view showing the perforation of the core material of FIG. 9A after removing the movable pin.

The insulated material covers the opening 162 of the perforation 16, and fills the gap between the core material 11 and the mold cavity 61 of the second mold 60 as well as the interior of the perforation 16. When the movable pin 62 is removed from the insulated layer 13, the notch 15 formed on the insulated layer 13 is exposed, as shown in FIG. 9B.

Figure 10:
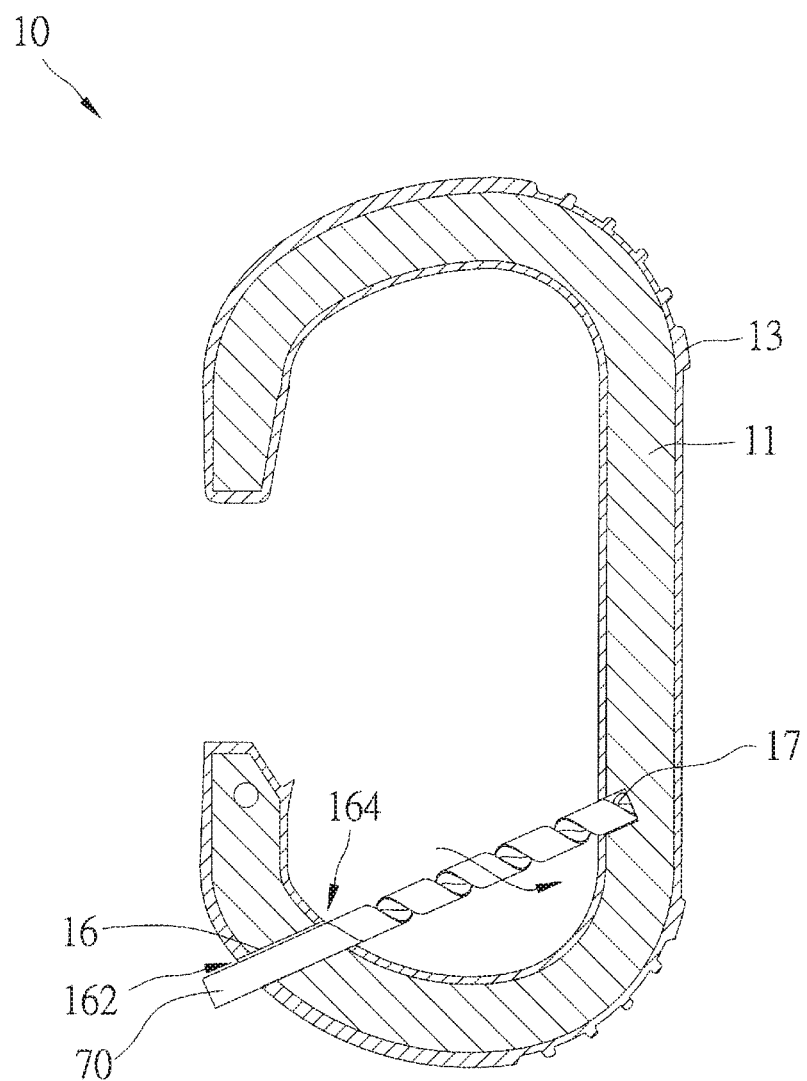
FIG. 10 is a sectional view showing the removal tool which removes the insulated material in the perforation of the core material of the first embodiment.
Figure 11:
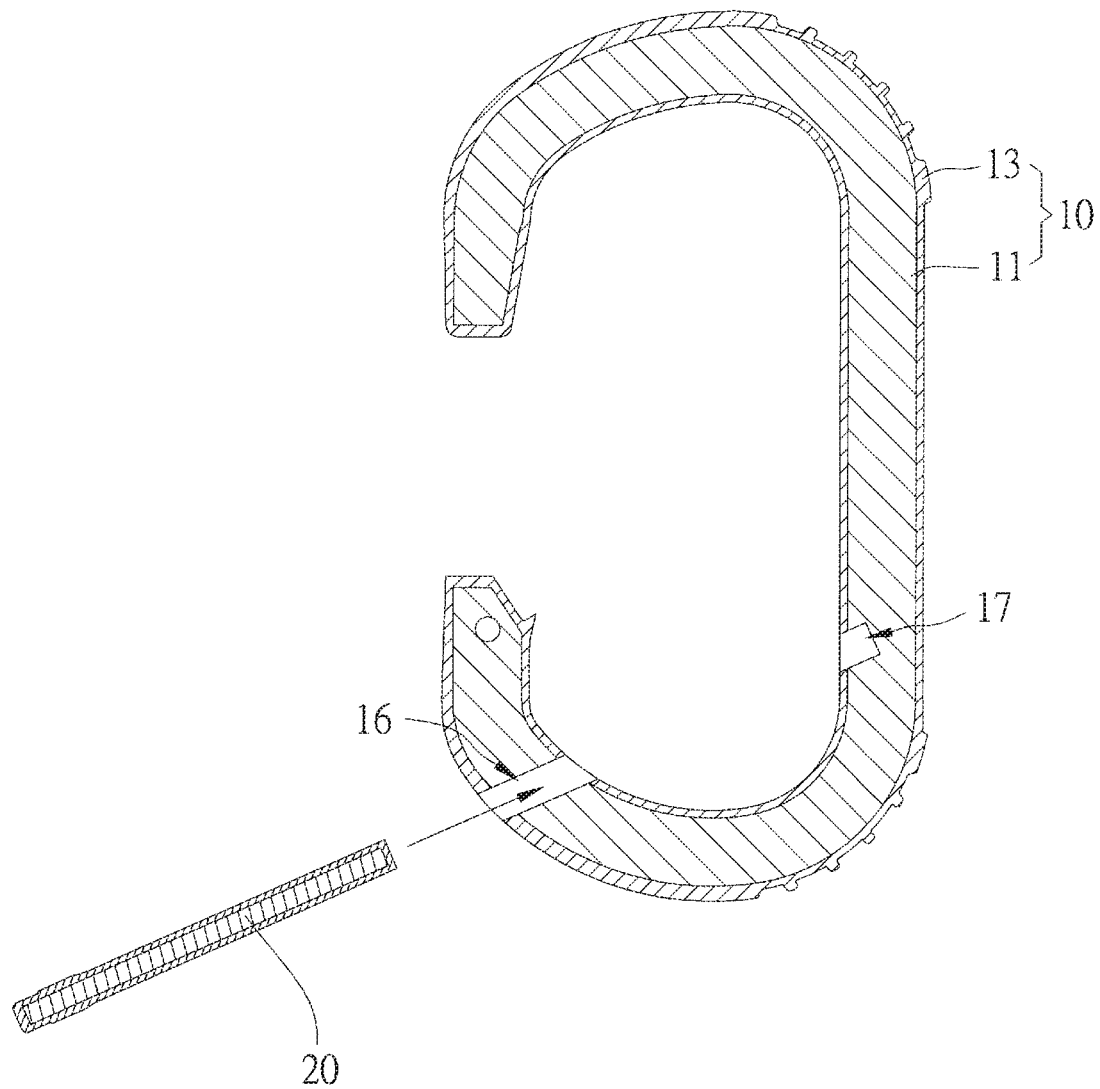
FIG. 11 is sectional view showing the insulated set pin passing the set pin hole of the first embodiment.

Next, as illustrated in FIG. 10, aim the removal tool 70 at the notch 15, and use the removal tool 70 to remove the insulated material at the other opening 164 of the perforation 16 and in the perforation 16, and furthermore to remove the insulated material at the opening of the recess 17 and in the recess 17, so as to form the set pin hole. In those embodiments, the set pin hole is provided to be passed by the insulated set pin 20, as shown in FIG. 11. And end of the insulated set pin 20 passes through the perforation 16, and the other end is inserted into the recess 17 so that the insulated set pin 20 is fixed to the insulated main body 10, as shown in FIG. 4.

By the design of the present invention, in the method of forming the set pin hole of an insulated carbine hook, the movable pin in the mold forms the notch on the insulated layer aligned with the set pin perforation so that it would be easy to recognize and aim the removal tool at the notch for removing the insulated material inside the perforation, which achieves the purpose of easily producing the main body of the insulated carbine hook with a set pin hole. Thereby, the position of the perforation of the core material can be easily found by a processor or aimed by a processing tool from the appearance of the main body of the insulated carbine hook, and therefore, the insulated material in the perforation can be removed by simple tools. Accordingly, the processing time of the main body of the insulated carbine hook is significantly reduced, which improves the manufacturing efficiency of the main body of the insulated carbine hook.

The embodiments described above are only preferred embodiments of the present invention. All equivalent methods which employ the concepts disclosed in this specification and the appended claims should fall within the scope of the present invention.

What is claimed is:

1. A method of forming an insulated carbine hook, which comprises the steps of:
  A) providing a core material which has a perforation and a recess; and
  B) putting the core material in a mold cavity of a mold which comprises a movable pin protruding from an inner surface of the mold cavity, wherein the movable pin is disposed on an axial extension line the perforation of the core material; an outer diameter of the movable pin is smaller than an inner diameter of the perforation;
  filling an insulated material in the mold cavity, wherein the insulated material is filled between an outer surface of the core material and the inner surface of the mold cavity as well as filled in the perforation and the recess to form an insulated intermediate that coats the outer surface of the core material and the perforation as well as the recess;
  removing the movable pin and taking out the core material coated with the insulated intermediate, wherein the insulated intermediate has a notch formed by removing the movable pin; the notch corresponds to an opening of the perforation; and
  aiming a removal tool at the notch, and removing the insulated material in the perforation by the removal tool, and furthermore removing the insulated material in the recess by the removal tool, so as to form a set pin hole.

2. The method of claim 1, wherein the axial extension line of the perforation passes through the recess.

3. The method of claim 1, wherein in step B), the movable pin is provided inside the perforation of the core material.

4. The method of claim 1, wherein in step B), an end surface of the movable pin is provided at the opening of the perforation of the core material, and the end surface of the movable pin is level with the opening.

5. The method of claim 1, wherein in step B), an end surface of the movable pin is located out of the perforation and faces towards the opening of the perforation; the surface of the movable pin is located between the inner surface of the mold cavity and the outer surface of the core material.

6. The method of claim 1, wherein the core material is substantially C-shaped and has an opening on a left side of the core material; the perforation is provided on either the left side or a right side of the core material, while the recess is provided on the other side and is located on the axial extension line of the perforation.

7. The method of claim 1, wherein the removal tool is a drill.

* * * * *